United States Patent
Watanabe et al.

(10) Patent No.: US 9,121,518 B2
(45) Date of Patent: Sep. 1, 2015

(54) SPOOL VALVE

(71) Applicant: HONDA MOTOR CO., LTD., Tokyo (JP)

(72) Inventors: Takahide Watanabe, Wako (JP); Masahiko Mizuguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 14/109,836

(22) Filed: Dec. 17, 2013

(65) Prior Publication Data

US 2014/0166139 A1 Jun. 19, 2014

(30) Foreign Application Priority Data

Dec. 18, 2012 (JP) .................. 2012-275876

(51) Int. Cl.
*F16K 11/04* (2006.01)
*F16K 11/07* (2006.01)

(52) U.S. Cl.
CPC ............. *F16K 11/04* (2013.01); *F16K 11/0708* (2013.01); *F16K 11/0716* (2013.01); *Y10T 137/86445* (2015.04); *Y10T 137/86775* (2015.04)

(58) Field of Classification Search
CPC . F16K 11/04; F16K 11/0708; F16K 11/0716; Y10T 137/86775; Y10T 137/86879; Y10T 137/8667; Y10T 137/86694; Y10T 137/86702; Y10T 137/8671; Y10T 137/87169; Y10T 137/86501; Y10T 137/86549; Y10T 137/86767; Y10T 137/86759; Y10T 137/86791; Y10T 137/86799; Y10T 137/86574; Y10T 137/86445
See application file for complete search history.

(56) References Cited

U.S. PATENT DOCUMENTS

| | | | | |
|---|---|---|---|---|
| 2,506,111 A | * | 5/1950 | Saint | 251/172 |
| 2,964,023 A | * | 12/1960 | Meulendyk | 137/625.12 |
| 3,698,435 A | * | 10/1972 | Evans | 137/625.18 |
| 5,275,195 A | * | 1/1994 | Breda | 137/100 |
| 5,469,888 A | * | 11/1995 | McAlister | 137/625.17 |
| 5,492,149 A | * | 2/1996 | Loschelder et al. | 137/625.4 |
| 2012/0073687 A1 | * | 3/2012 | Hanson et al. | 137/625.17 |
| 2012/0145252 A1 | * | 6/2012 | Hunnicutt | 137/14 |

FOREIGN PATENT DOCUMENTS

JP 2002-206651 7/2002

* cited by examiner

*Primary Examiner* — John Fox
*Assistant Examiner* — Michael R Reid
(74) *Attorney, Agent, or Firm* — Mori & Ward, LLP

(57) ABSTRACT

A spool valve includes a valve housing and a spool. The valve housing includes a spool hole, a first oil passage, and a second oil passage. The first oil passage has a first port, a second port and a third port that are open to the spool hole. The second oil passage has a fourth port, a fifth port and a sixth port that are open to the spool hole. The spool includes a first oil groove, a second oil groove, a third oil groove, a fourth oil groove, a first communication passage, and a second communication passage. The spool is slidable in the spool hole to switch communication of the third oil groove with the second port and the third port and to switch communication of the fourth oil groove with the fifth port and the sixth port.

4 Claims, 9 Drawing Sheets

SPOOL VALVE

CROSS-REFERENCE TO RELATED APPLICATIONS

The present application claims priority under 35 U.S.C. §119 to Japanese Patent Application No. 2012-275876, filed Dec. 18, 2012, entitled "Spool Valve." The contents of this application are incorporated herein by reference in their entirety.

BACKGROUND

1. Field

The present disclosure relates to a spool valve.

2. Description of the Related Art

Spool valves have configurations in which spools are slidably placed in spool holes of valve housings. Such spool valves have often been used for various applications including pressure control valves and flow rate control valves. Such a known spool valve includes a valve housing having a substantially cylindrical spool hole, a spool placed in the spool hole and having a substantially cylindrical columnar shape, and a spring for biasing the spool in the spool hole. The spring is located at an end of the spool in the spool hole, and biases the spool toward the other end along an axial direction. The valve housing has an oil passage having a plurality of ports that are open at the inner peripheral surface of the spool hole. The ports of the oil passage communicate with oil grooves formed in the outer peripheral surface of the spool. The valve housing has a control pressure supply passage through which a control hydraulic pressure for operating the spool is supplied.

The spool valve as described above supplies the control hydraulic pressure through the control pressure supply passage, and thereby, performs control such that the Spool slides toward the end facing the spring against a biasing force of the spring. In this manner, a communication state between the ports open to the spool hole and the oil grooves in the spool is switched, and the distribution path in the oil passage is controllably switched. Japanese Unexamined Patent Application Publication No. 2002-206651 is an example of related art.

SUMMARY

According to one aspect of the present invention, a spool valve includes a valve housing and a spool. The valve housing includes a spool hole, a first oil passage, and a second oil passage. The first oil passage has a first port, a second port and a third port that are open to the spool hole. The second oil passage has a fourth port, a fifth port and a sixth port that are open to the spool hole. The spool is located in the spool hole to slide in an axial direction of the spool hole. The spool includes a first oil groove, a second oil groove, a third oil groove, a fourth oil groove, a first communication passage, and a second communication passage. The first oil groove is located in an outer peripheral surface of the spool. The second oil groove is located in the outer peripheral surface of the spool. The third oil groove is located in the outer peripheral surface of the spool. The fourth oil groove is located in the outer peripheral surface of the spool. The first oil groove, the second oil groove, the third oil groove and the fourth oil groove are circumferentially arranged at an identical position in the axial direction. The first communication passage penetrates through the spool from the first oil groove to the third oil groove. The second communication passage penetrates through the spool from the second oil groove to the fourth oil groove. The first port of the first oil passage is provided to communicate with the first oil groove of the spool. The second port and the third port are provided to selectively communicate with the third oil groove of the spool. The fourth port of the second oil passage is provided to communicate with the second oil groove of the spool. The fifth port and the sixth port are provided to selectively communicate with the fourth oil groove of the spool. The spool is slidable in the spool hole to switch communication of the third oil groove with the second port and the third port and to switch communication of the fourth oil groove with the fifth port and the sixth port.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1A is a front view when viewed in an axial direction, FIG. 1B is a cross-sectional view taken along the line IB-IB in FIG. 1A, and FIG. 1C is a perspective view;

FIG. 2A is a cross-sectional view taken along the line IIA-IIA in FIG. 1A, and FIG. 2B is a cross-sectional view taken along the line IIB-IIB in FIG. 1A;

FIG. 3A is a cross-sectional view taken along the line IIIA-IIIA in FIG. 2A, FIG. 3B is a cross-sectional view taken along the line IIIB-IIIB in FIG. 2A, and FIG. 3C is a cross-sectional view taken along the line IIIC-IIIC in FIG. 2A;

FIG. 7A is a perspective view illustrating a spool, and FIG. 7B is a cross-sectional view illustrating a portion near a rear end of the spool valve when viewed in the axial direction;

FIG. 8A is a perspective view illustrating a spool, and FIG. 8B is a cross-sectional view illustrating a portion near a rear end of the spool valve when viewed in the axial direction; FIG. 9A is a perspective view illustrating a spool, and FIG. 9B is a cross-sectional view illustrating a portion near a rear end of the spool valve when viewed in the axial direction.

DESCRIPTION OF THE EMBODIMENTS

Figure 1A:
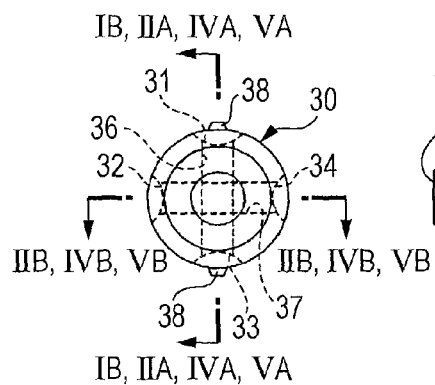
FIGS. 1A to 1C illustrate a spool included in a spool valve according to a first embodiment of the present disclosure, where

The embodiments will now be described with reference to the accompanying drawings, wherein like reference numerals designate corresponding or identical elements throughout the various drawings.

First Embodiment

Figure 1B:
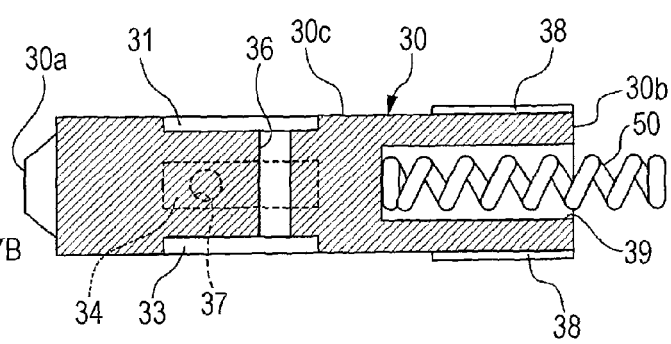
Figure 1C:
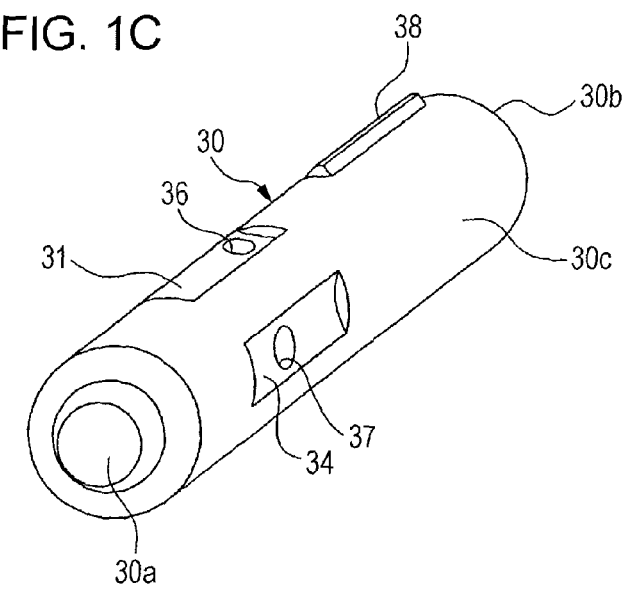

FIGS. 1A to 1C illustrate a spool included in a spool valve according to a first embodiment of the present disclosure.

Figure 2A:
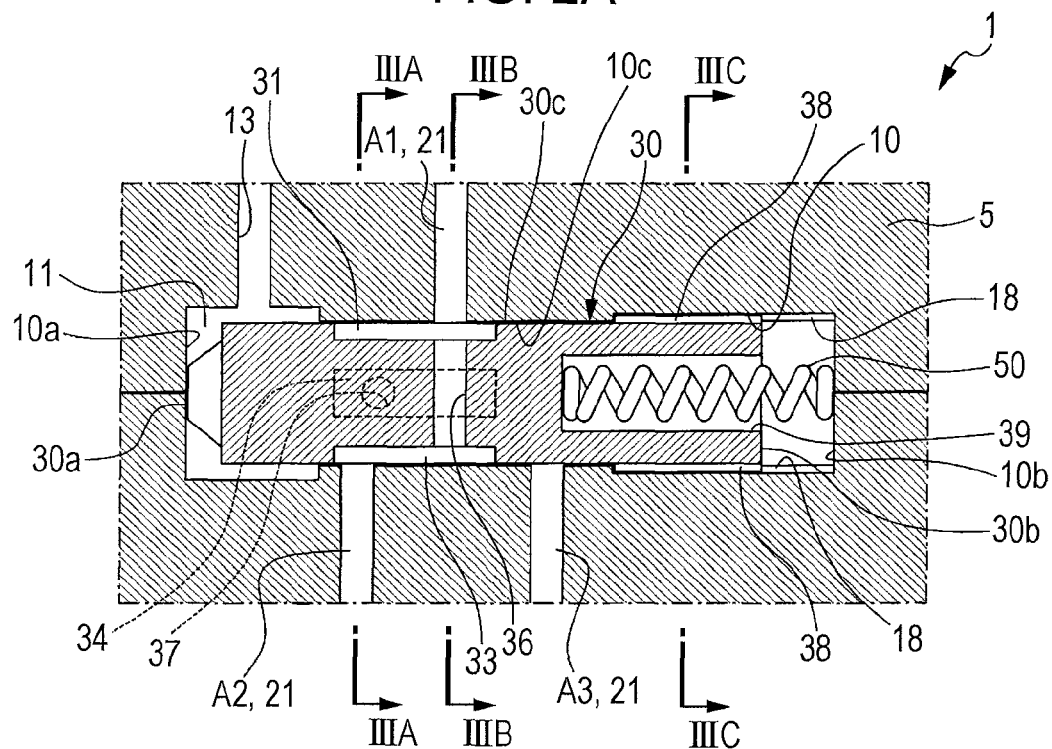
FIGS. 2A and 2B illustrate the spool valve, where
Figure 2B:
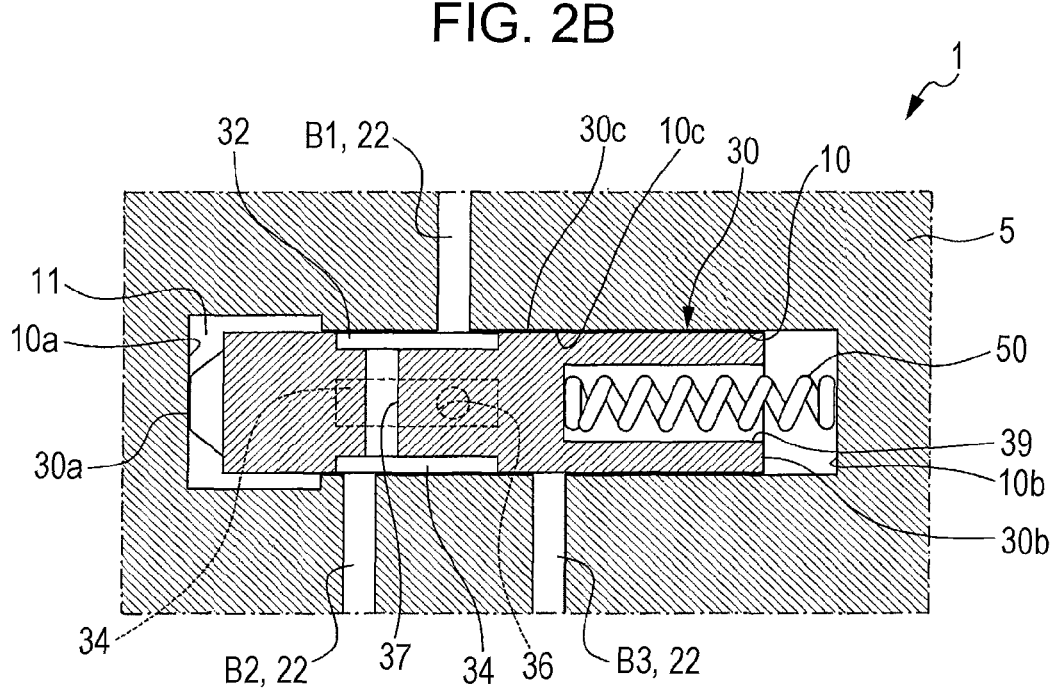
Figure 3A:
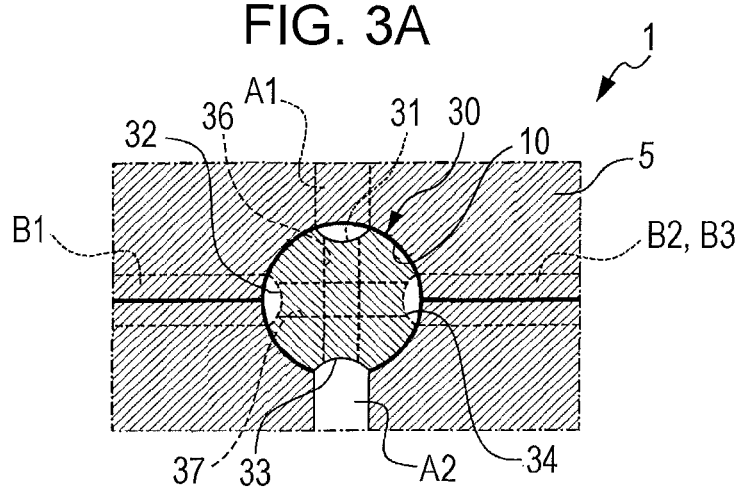
FIGS. 3A to 3C illustrate the spool valve, where
Figure 3B:
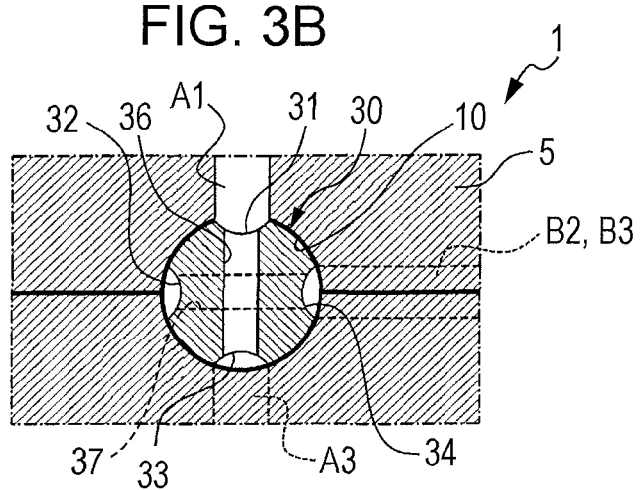
Figure 3C:
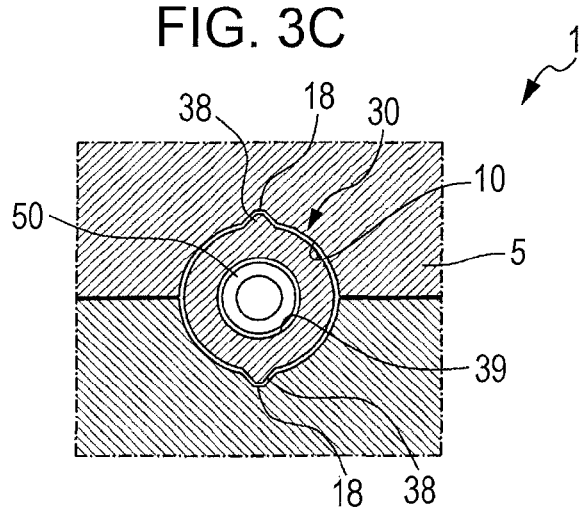

FIG. 1A is a front view taken in an axial direction, FIG. 1B is a cross-sectional view taken along the line IB-IB in FIG. 1A, and FIG. 1C is a perspective view. FIGS. 2A and 2B and FIGS. 3A to 3C illustrate the spool valve. FIG. 2A is a cross-sectional view taken along the line IIA-IIA in FIG. 1A, and FIG. 2B is a cross-sectional view taken along the line IIB-IIB in FIG. 1A. FIG. 3A is a cross-sectional view taken along the line IIIA-IIIA in FIG. 2A, FIG. 3B is a cross-sectional view taken along the line IIIB-IIIB in FIG. 2A, and FIG. 3C is a cross-sectional view taken along the line IIIC-IIIC in FIG. 2A. The spool valve 1 illustrated in these drawings includes: a valve housing (control body) 5 having a substantially cylindrical spool hole 10; a cylindrical columnar spool 30 placed (housed) in the spool hole 10; and a coil spring (biasing unit) 50 that biases the spool 30 toward one end in the axial direction (hereinafter referred to as a "front end") in the spool hole 10. The top, bottom, left, and right of the spool 30 when viewed from the front end in the axial direction in FIG. 1A will be herein referred to as the top, bottom, left, and right, respectively.

The spool 30 is a substantially cylindrical columnar member placed in the substantially cylindrical spool hole 10, and four oil grooves 31 to 34 are formed around the outer peripheral surface of the spool 30 and are circumferentially spaced 90 degrees apart from one another. The four oil grooves include: a top oil groove (first oil groove) 31 on the top side of an outer peripheral surface 30c of the spool 30; a bottom oil groove (third oil groove) 33 on the bottom side of the outer peripheral surface 30c; a left oil groove (second oil groove) 32 on the left side of the outer peripheral surface 30c; and a right oil groove (fourth oil groove) 34 on the right side of the outer peripheral surface 30c. Each of the oil grooves 31 to 34 is formed by removing part of the circumferential outer peripheral surface 30c of the spool 30, and has a rectangular outer shape with its longer sides oriented along the axis of the spool 30. The oil grooves 31 to 34 have an identical shape and identical dimensions, and are located at an identical position in the axial direction around the outer peripheral surface 30c of the spool 30. The spool 30 includes: a vertical communication passage (first communication passage) 36 penetrating through the spool 30 from the top oil groove 31 to the bottom oil groove 33; and a horizontal communication passage (second communication passage) 37 allowing the left oil groove 32 and the right oil groove 34 to communicate with each other. The vertical communication passage 36 and the horizontal communication passage 37 are displaced from each other in the front-to-rear direction along the axis of the spool 30. That is, the horizontal communication passage 37 is located at a front portion in the axial direction, whereas the vertical communication passage 36 is located at a rear portion in the axial direction. As illustrated in FIG. 1B, the longitudinal directions of the vertical communication passage 36 and the horizontal communication passage 37 form an angle of 90 degrees when viewed in the axial direction of the spool 30.

Projecting ribs (anti-rotation ribs) 38 extending in the axial direction (front-to-rear direction) are formed on the outer peripheral surface 30c near the rear end surface 30b of the spool 30. The number of the ribs 38 is two in total: a rib 38 on the top side of the outer peripheral surface 30c of the spool 30 and a rib on the bottom side of the outer peripheral surface 30c of the spool 30. The rear end surface 30b of the spool 30 has a recess 39 that houses the coil spring 50. The recess 39 is a cylindrical indentation axially extending from the rear end surface 30b of the spool 30 toward the front end, and houses part of the front end of the coil spring 50.

The spool hole 10 of the control body 5 is a substantially cylindrical columnar hole having an inner peripheral surface 10c parallel to the outer peripheral surface 30c of the spool 30. The spool hole 10 includes: first through third ports A1 to A3 (see FIG. 2A) extending vertically through the control body 5 and communicating with the inner peripheral surface 10c of the spool hole 10; and fourth through sixth ports B1 to B3 (see FIG. 2B) extending horizontally through the control body 5 and communicating with the inner peripheral surface 10c of the spool hole 10. As illustrated in FIG. 2A, the first port A1 communicates with the inner peripheral surface 10c at the top of the spool hole 10 from above the spool hole 10 in the control body 5. The second and third ports A2 and A3 communicate with the inner peripheral surface 10c at the bottom of the spool hole 10 from below the spool hole 10 in the control body 5. As illustrated in FIG. 2B, the fourth port B1 communicates with the inner peripheral surface 10c at the left of the spool hole 10 from the left of the spool hole 10 in the control body 5. The fifth and sixth ports B2 and B3 communicate with the inner peripheral surface 10c at the right of the spool hole 10 from the right of the spool hole 10 in the control body 5.

The first port A1 faces the top oil groove 31 of the spool 30 in the spool hole 10. The second and third ports A2 and A3 face the bottom oil groove 33 of the spool 30 in the spool hole 10. The fourth port B1 faces the left oil groove 32 of the spool 30 in the spool hole 10. The fifth and sixth ports B2 and B3 face the right oil groove 34 of the spool 30 in the spool hole 10.

The first through third ports A1 to A3, the top oil groove 31, the bottom oil groove 33, and the vertical communication passage 36 constitute a first oil passage 21. The fourth through sixth ports B1 to B3, the left oil groove 32, the right oil groove 34, and the horizontal communication passage 37 constitute a second oil passage 22. In the spool valve 1 of the present embodiment, the top oil groove 31 and the bottom oil groove 33 constituting the first oil passage 21 are located at the same position, in the axial direction, as the left oil groove 32 and the right oil groove 34 constituting the second oil passage 22 in the outer peripheral surface 30c of the spool 30. Accordingly, the first through third ports A1 to A3 constituting the first oil passage 21 overlap the fourth through sixth ports B1 to B3 constituting the second oil passage 22 at the same position in the axial direction of the spool 30. That is, the first oil passage 21 and the second oil passage 22 overlap each other at the same position in the axial direction of the spool valve 1.

A control pressure port 11 composed of a ring-shaped indentation is formed in a portion of the spool 30 corresponding to a front end surface 30a of the spool hole 10 and a vicinity thereof. The control pressure port 11 communicates with a control pressure oil passage 13 extending from the inside of the control body 5. On the other hand, the spool 30 is biased toward the front end in the axial direction under a biasing force of the coil spring (biasing unit) 50 located between the bottom of the recess 39 of the spool 30 and the rear end surface 10b of the spool hole 10. In this manner, in a normal state (before actuation), the front end surface 30a of the spool 30 is in contact with the front end surface 10a of the spool hole 10. When actuation oil for controlling the spool flows into the control pressure port 11 through the control pressure oil passage 13, the internal pressure of the control pressure port 11 increases. When the internal pressure of the control pressure port 11 then reaches and exceeds a predetermined pressure, the internal pressure of the control pressure port 11 causes the spool 30 to move (slide) rearward in the spool hole 10 against the biasing force of the coil spring 50 (in an actuation state).

Guide grooves 18 for guiding the ribs 38 are formed in the inner peripheral surface 10c of the spool hole 10 at positions corresponding to the ribs 38 of the spool 30. The guide grooves 18 linearly extend in the axial direction (i.e., the longitudinal direction) of the spool 30, and guide the ribs 38 in the front-to-rear direction within a range where the spool 30 moves in the spool hole 10. The presence of the ribs 38 in the guide grooves 18 can prevent circumferential rotation of the spool 30 in the spool hole 10. With this configuration, the oil grooves 31 to 34 for the ports A1 to A3 and the ports B1 to B3 are positioned (in the direction along the periphery of the spool 30).

Figure 4A:
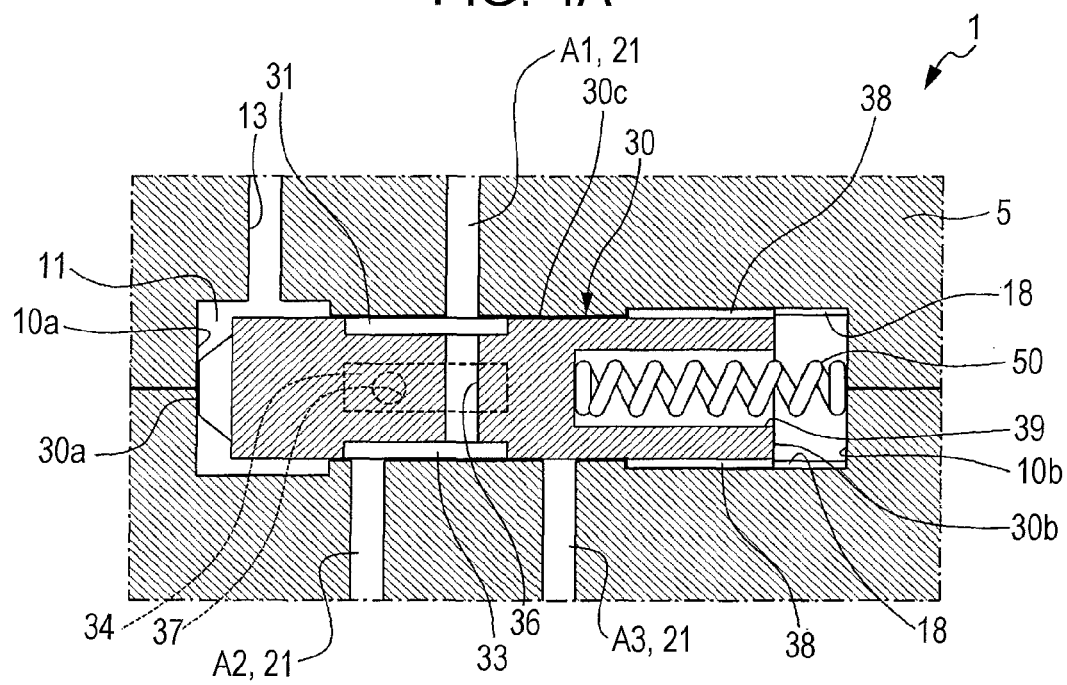
FIGS. 4A and 4B illustrate operation of the spool valve and show the state of the spool before actuation.
Figure 4B:
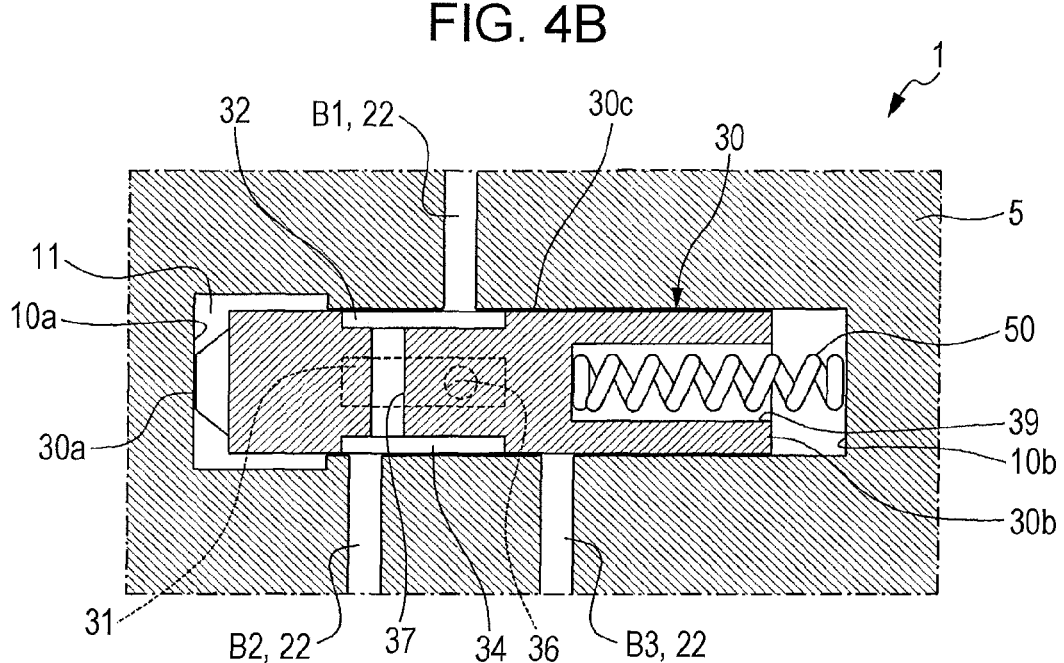
Figure 5A:
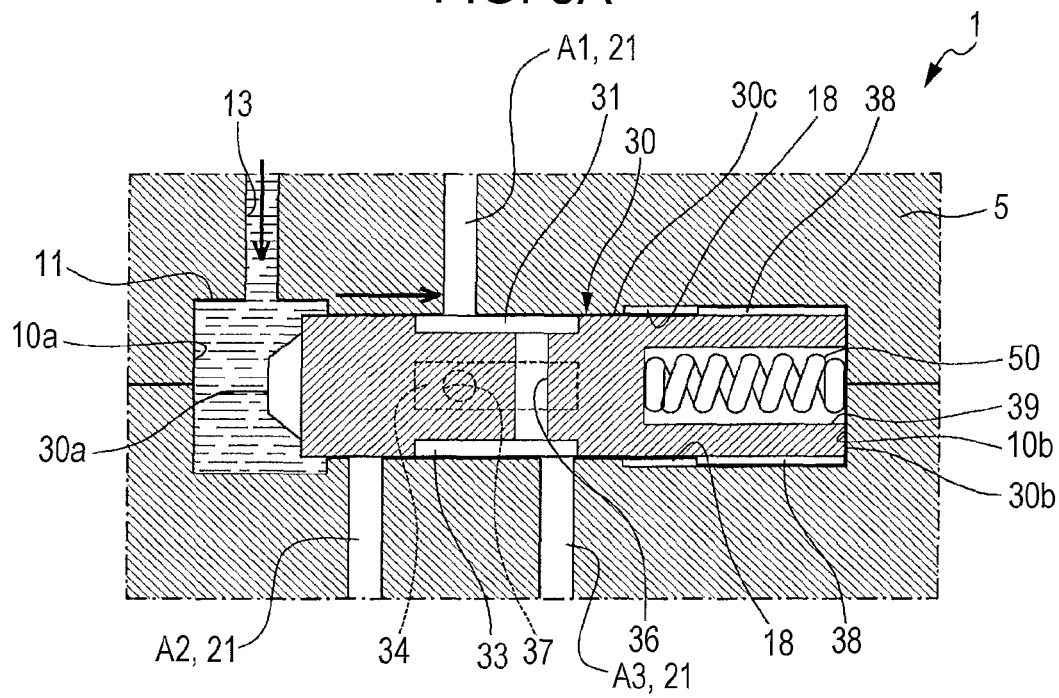
FIGS. 5A and 5B illustrate operation of the spool valve and show the state of the spool during actuation.
Figure 5B:
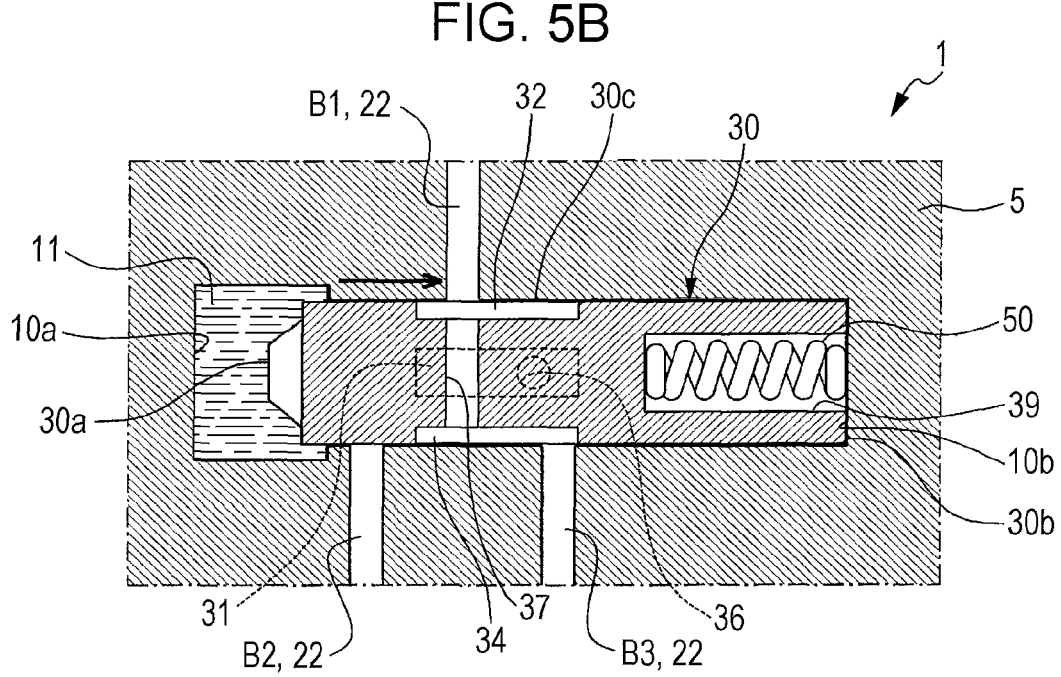

It will now be described how the oil passages are switched between the ports in accordance with operation of the spool valve 1 having the above-described configuration. FIGS. 4A and 4B and FIGS. 5A and 5B illustrate operation of the spool valve 1. FIGS. 4A and 5A are cross-sectional views taken along the line IVA-IVA and VA-VA, respectively, in FIG. 1A, and FIGS. 4B and 5B are cross-sectional views taken along the line IVB-IVB and VB-VB, respectively, in FIG. 1A. In the spool valve 1, before actuation, i.e., before a hydraulic pressure (control hydraulic pressure) of actuation oil is not supplied to the control pressure port 11, the spool 30 is located near the front end surface 10a of the spool hole 10, as illustrated in FIGS. 4A and 4B.

In this state, as illustrated in FIG. 4A, the first port A1 communicates with the top oil groove 31 of the spool 30, and the second port A2 communicates with the bottom oil groove 33 of the spool 30. Thus, in the first oil passage 21, the first port A1 and the second port A2 communicate with each other through the vertical communication passage 36 in the spool 30. As illustrated in FIG. 4B, the fourth port B1 communicates with the left oil groove 32 of the spool 30, and the fifth port B2 communicates with the right oil groove 34 of the spool 30. Thus, in the second oil passage 22, the fourth port B1 and the fifth port B2 communicate with each other through the horizontal communication passage 37 in the spool 30.

In the spool valve 1, the spool 30 is controlled to move rearward against the biasing force of the coil spring 50 with a supply of the control hydraulic pressure from the control pressure oil passage to the control pressure port 11. Specifically, as described above, when the internal pressure of the control pressure port 11 reaches and exceeds a predetermined pressure, the internal pressure of the control pressure port 11 causes the spool 30 to move (slide) rearward in the spool hole 10 against the biasing force of the coil spring 50.

In a state where the spool 30 has moved rearward in the spool hole 10, the first port A1 communicates with the top oil groove 31 of the spool 30 and the third port A3 communicates with the bottom oil groove 33 of the spool 30, as illustrated in FIG. 5A. Thus, in the first oil passage 21, the first port A1 and the third port A3 communicate with each other through the vertical communication passage 36 of the spool 30. In addition, as illustrated in FIG. 5B, the fourth port B1 communicates with the left oil groove 32 of the spool 30 and the sixth port B3 communicates with the right oil groove 34 of the spool 30. Thus, in the second oil passage 22, the fourth port B1 and the sixth port B3 communicate with each other through the horizontal communication passage 37 of the spool 30.

In this manner, in the spool valve 1 of the present embodiment, sliding of the spool 30 in the axial direction within the spool hole 10 enables switching of communication with the third oil groove 33 of the spool 30 between the second port A2 and the third port A3 and switching of communication with the fourth oil groove 34 of the spool 30 between the fifth port B2 and the sixth port B3 to be simultaneously performed.

That is, switching of the communication state of the first oil passage 21 and the switching of the communication state of the second oil passage 22 are simultaneously performed.

As described above, the spool valve 1 of the present embodiment includes: the first oil passage 21 having first through third ports A1 to A3 that are located in the control body (valve housing) 5 and are open to the spool hole 10; the second oil passage 22 having fourth through sixth ports B1 to B3 that are located in the control body 5 and are open to the spool hole 10; the first through fourth oil grooves 31 to 34 that are located in the outer peripheral surface 30c of the spool 30 and are circumferentially arranged at predetermined intervals; the vertical communication passage (first communication passage) 36 penetrating through the spool 30 from the top oil groove 31 to the bottom oil groove 33; and the horizontal communication passage (second communication passage) 37 penetrating through the spool 30 from the left oil groove 32 to the right oil groove 34. The first port A1 of the first oil passage 21 communicates with the top oil groove 31 of the spool 30. The second port A2 and the third port A3 selectively communicate with the bottom oil groove 33 of the spool 30. The fourth port B1 of the second oil passage 22 communicates with the left oil groove 32 of the spool 30. The fifth port B2 and the sixth port B3 selectively communicate with the right oil groove 34 of the spool 30. Sliding of the spool 30 in the spool hole 10 enables switching of communication with the bottom oil groove 33 between the second port A2 and the third port A3 and switching of communication with the right oil groove 34 between the fifth port B2 and the sixth port B3.

In this manner, the first oil passage 21 having the first through third ports A1 to A3 and the second oil passage 22 having the fourth through sixth ports B1 to B3 can be disposed to overlap each other at the same position in the axial direction (the direction along which the spool 30 slides). Accordingly, the spool valve 1 of the present embodiment enables simultaneous switching of the distribution paths of the two oil passages, i.e., the first oil passage 21 and the second oil passage 22, and in addition, is able to have a shorter longitudinal dimension in the axial direction than a spool valve 100 with a configuration according to the related art. As a result, the spool valve 1 and a hydraulic pressure control device of a vehicle equipped with the spool valve 1 can be reduced in size and weight.

Figures 6A, 6B:
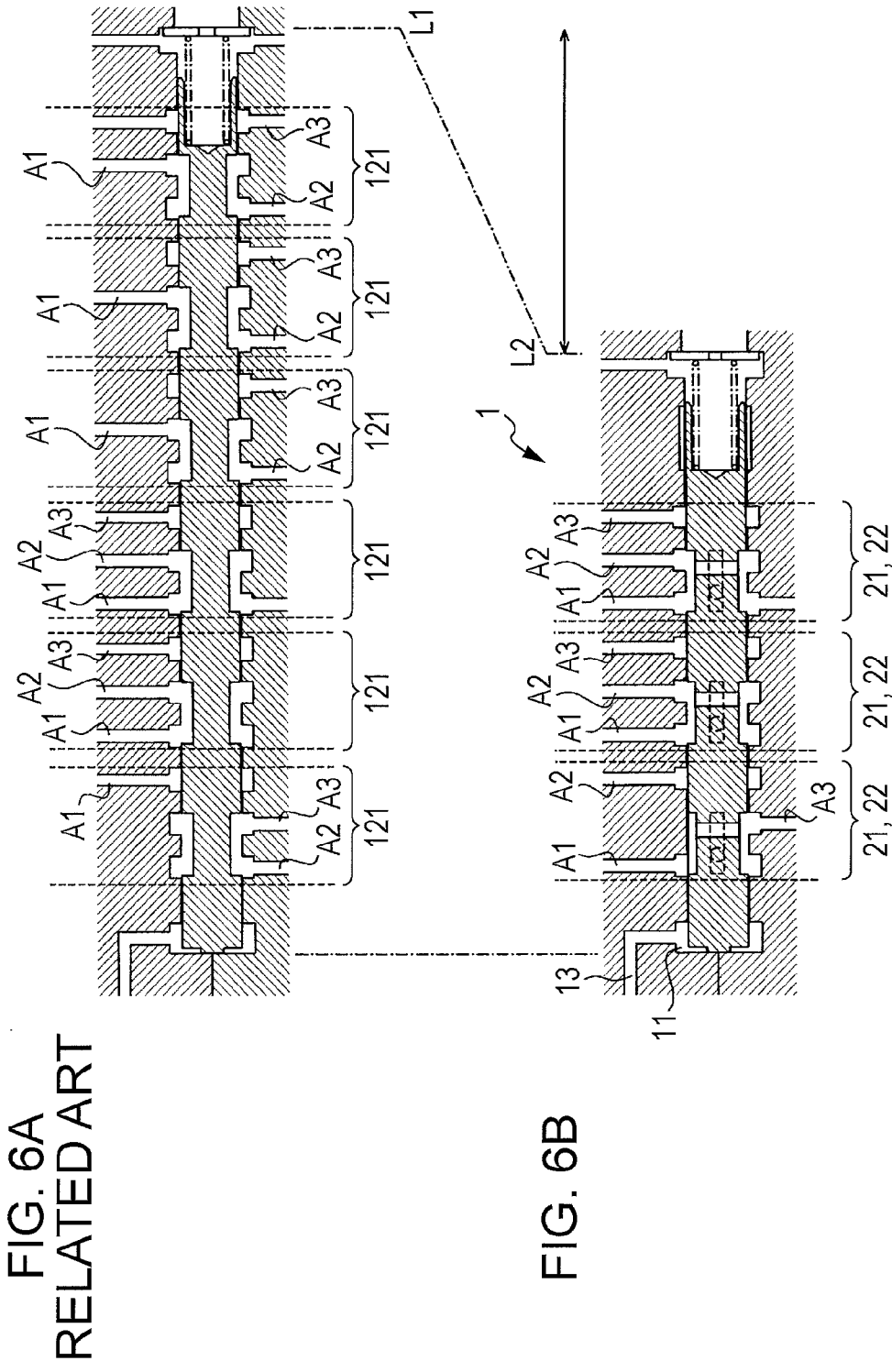
FIGS. 6A and 6B demonstrate a comparison between a spool valve of a related art and a spool valve of the present disclosure.

FIGS. 6A and 6B demonstrate a comparison between the spool valve 100 and the spool valve 1 of the present embodiment. FIG. 6A is a cross-sectional view of the spool valve 100, and FIG. 6B is a cross-sectional view of the spool valve 1 of the present embodiment. The spool valve 100 illustrated in FIG. 6A includes six (six pairs of) oil passages 121 each having the first through third ports A1 to A3. The oil passages 121 are aligned in the axial direction of the spool valve 100. The states of flow in the six oil passages 121 are simultaneously switched between the ports when the spool 30 is actuated with a supply of actuation oil to the control pressure port 111. On the other hand, as described above, the spool valve 1 of the present embodiment illustrated in FIG. 6B is configured such that the first oil passage 21 having the first through third ports A1 to A3 and the second oil passage 22 having the fourth through sixth ports B1 to B3 overlap each other at the same location in the axial direction of the spool 30. This configuration includes three pairs of the first oil passages 21 and the second oil passages 22.

Thus, the spool valve 100 needs to have a longitudinal dimension L1 corresponding to the six oil passages 121 in total. On the other hand, it is sufficient for the spool valve 1 of the present embodiment to have a longitudinal dimension L2 corresponding to three oil passages in total because the first oil passage 21 and the second oil passage 22 in each of the three pairs of oil passages are located at the same position in the axial direction of the spool valve 1. In this manner, the spool valve 1 of the present embodiment can have a reduced longitudinal dimension (longitudinal dimension in the direction in which the spool 30 slides), while allowing the same number of oil passages as in the spool valve 100 to be simultaneously switched between the ports.

Second Embodiment

A second embodiment of the present disclosure will now be described. In the description and its associated drawings of the second embodiment, like reference numerals are used to designate identical or equivalent elements to those of the first embodiment, and explanation thereof is not repeated. Configurations not described below are the same as those described in the first embodiment. The same holds for the other embodiments.

Figure 7A:
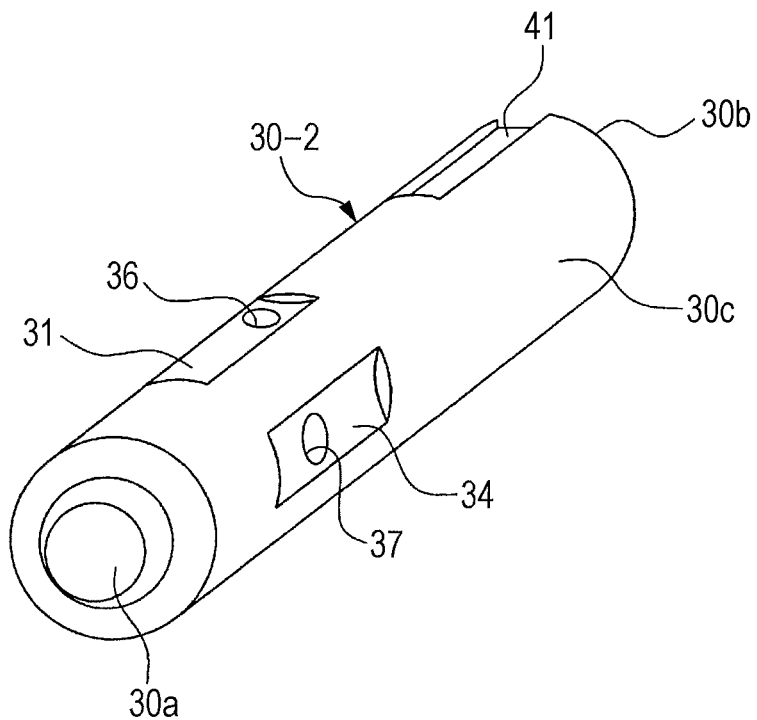
FIGS. 7A and 7B illustrate a spool valve according to a second embodiment of the present disclosure, where
Figure 7B:
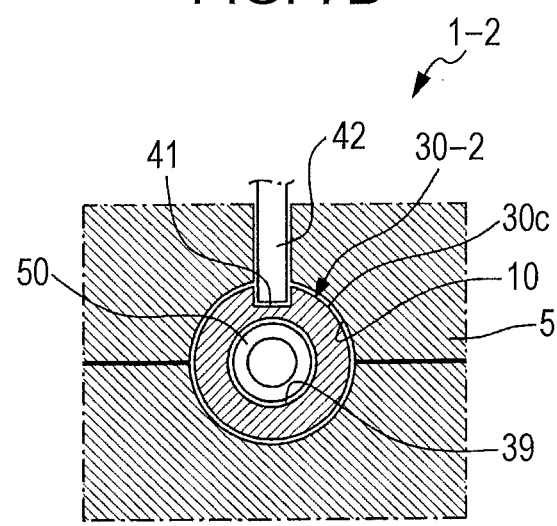

FIGS. 7A and 7B illustrate a spool valve 1-2 according to a second embodiment of the present disclosure. FIG. 7A is a perspective view illustrating a spool 30-2, and FIG. 7B is a cross-sectional view illustrating a portion near a rear end surface 30b of the spool 30-2 when viewed in the axial direction. The spool valve 1 of the first embodiment employs the anti-rotation mechanism for the spool 30 including the ribs 38 on the outer peripheral surface 30c of the spool 30 and the guide grooves 18 in the inner peripheral surface 10c of the spool hole 10. On the other hand, the spool valve 1-2 of the present embodiment employs an anti-rotation mechanism for the spool 30 including a groove 41 in an outer peripheral surface 30c of the spool 30 and an engagement piece (pin) 42 having the shape of a projection and projecting from an inner peripheral surface 10c of a spool hole 10 to be engaged with the groove 41. The groove 41 linearly extends in the axial direction of the spool 30. The engagement piece 42 is in the shape of a linear thin plate that is engaged with the groove 41.

This anti-rotation mechanism can also effectively prevent the spool 30 from rotating in the spool hole 10. Although not illustrated, the engagement piece 42 may be a projection integrally formed with a valve body 5 and projecting from the inner peripheral surface 10c of the spool hole 10.

Third Embodiment

Figure 8A:
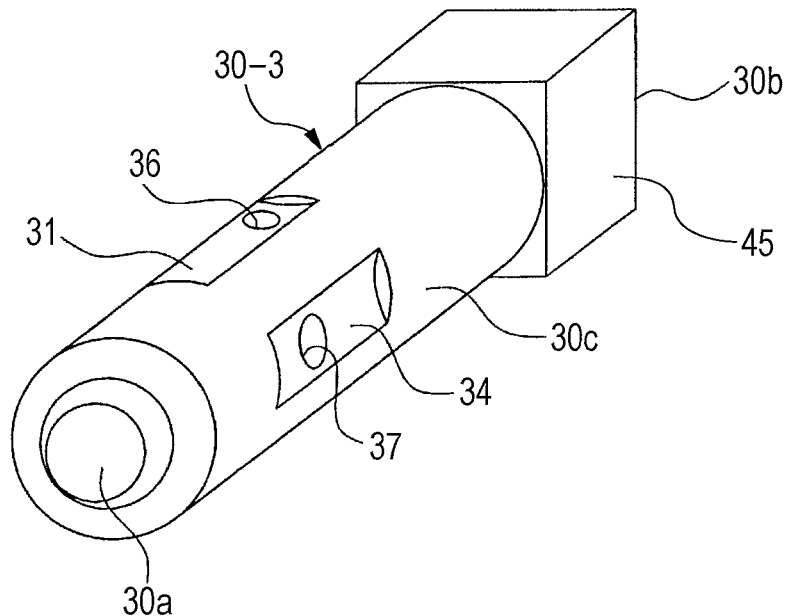
FIGS. 8A and 8B illustrate a spool valve according to a third embodiment of the present disclosure, where
Figure 8B:
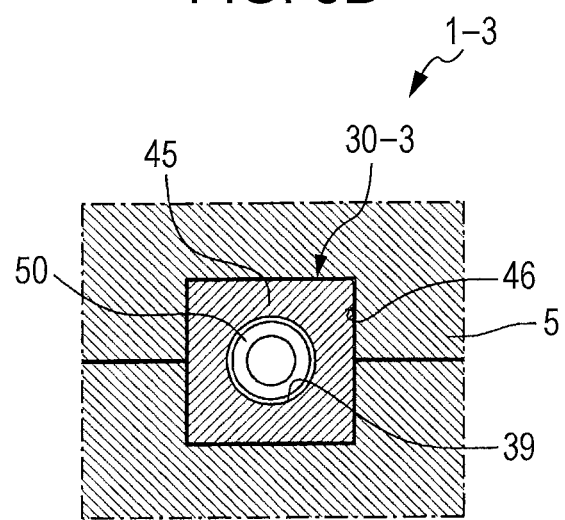

A third embodiment according to the present disclosure will now be described. FIGS. 8A and 8B illustrate a spool valve 1-3 according to the third embodiment of the present disclosure. FIG. 8A is a perspective view illustrating a spool 30-3, and FIG. 8B is a cross-sectional view illustrating a portion near a rear end surface 30b of the spool 30-3 when viewed in the axial direction. The spool valve 1-3 of the present embodiment employs an anti-rotation mechanism for the spool 30-3. This anti-rotation mechanism includes an anti-rotation part 45 located near the rear end surface 30b of the spool 30-3 and having a square outer peripheral shape in cross section. An accommodating part 46 having a square inner shape along the outer peripheral shape of the anti-rotation part 45 is provided at a position in the spool hole 10 corresponding to the anti-rotation part 45. The accommodating part 46 of the spool hole 10 accommodates the anti-rotation part 45 of the spool 30, thereby preventing the spool 30 from rotating.

Fourth Embodiment

Figure 9A:
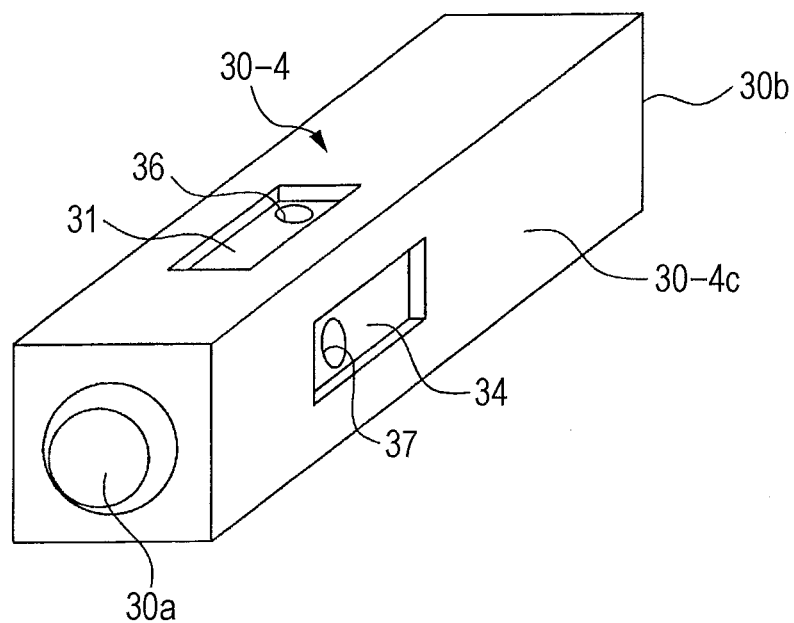
FIGS. 9A and 9B illustrate a spool valve according to a fourth embodiment of the present disclosure, where
Figure 9B:
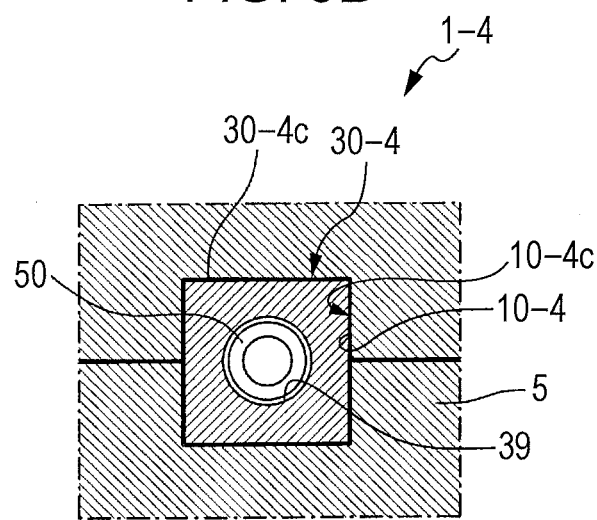

A fourth embodiment according to the present disclosure will now be described. FIGS. 9A and 9B illustrate a spool valve 1-4 according to the fourth embodiment of the present disclosure. FIG. 9A is a perspective view illustrating a spool 30-4, and FIG. 9B is a cross-sectional view illustrating a portion near a rear end surface 30b of the spool 30-4 when viewed in the axial direction. The spool valve 1-4 of the present embodiment employs an anti-rotation mechanism for the spool 30-4. In this anti-rotation mechanism, an outer peripheral surface 30-4c of the spool 30-4 has a square shape in cross section. Although not illustrated, an inner peripheral surface 10-4c of a spool hole 10-4 has a square shape in cross section conforming to the shape in cross section of the outer peripheral surface 30-4c of the spool 30-4. The spool hole 10-4 houses the spool 30-4, thereby preventing the spool 30-4 from rotating.

The embodiments of the present disclosure have been described above. The present disclosure, however, is not limited to the foregoing embodiments, and various changes and modifications may be made within the range of the technical idea described in the claims, specification, and drawings. For example, the number of oil passages of a spool valve and the number of ports of each oil passage are not limited to those described in the foregoing embodiments. The specific number and shape of oil grooves formed in a spool may be different from those described in the foregoing embodiments.

A spool valve (1) according to the embodiment including a valve housing (5) having a tubular spool hole (10) and a spool (30) that is located in the spool hole (10) and slides in an axial direction of the spool hole (10). The spool valve (1) includes: a first oil passage (21) having first through third ports (A1 to A3) that are located in the valve housing (5) and are open to the spool hole (10); a second oil passage (22) having fourth through sixth ports (B1 to B3) that are located in the valve housing (5) and are open to the spool hole (10); first through fourth oil grooves (31 to 34) that are located in an outer peripheral surface (30c) of the spool (30) and are circumferentially arranged at predetermined intervals at an identical position in the axial direction; a first communication passage (36) penetrating through the spool (30) from the first oil groove (31) to the third oil groove (33); and a second communication passage (37) penetrating through the spool (30) from the second oil groove (32) to the fourth oil groove (34). The first port (A1) of the first oil passage (21) communicates with the first oil groove (31) of the spool (30). The second port (A2) and the third port (A3) selectively communicate with the third oil groove (33) of the spool (30). The fourth port (B1) of the second oil passage (22) communicates with the second oil groove (32) of the spool (30). The fifth port (B2) and the sixth port (B3) selectively communicate with the fourth oil groove (34) of the spool (30). Sliding of the spool (30) in the spool hole (10) enables switching of communication with the third oil groove (33) between the second port (A2) and the third port (A3) and switching of communication with the fourth oil groove (34) between the fifth port (B2) and the sixth port (B3).

This configuration of the spool valve according to the embodiment enables the first through third ports constituting the first oil passage and the fourth through sixth ports constituting the second oil passage to overlap each other at the same position in axial direction (i.e., the direction along which the spool slides). Thus, the spool valve enables simultaneous switching of distribution paths of the two types of oil passages, i.e., the first oil passage and the second oil passage, and in addition, is allowed to have a shorter longitudinal dimension in the axial direction than a spool valve with a configuration according to the related art. As a result, the spool valve and a hydraulic pressure control device of a vehicle equipped with the spool valve can be reduced in size and weight.

In the above-described spool valve according to the embodiment, optionally, the first through fourth oil grooves (31 to 34) may be circumferentially spaced 90 degrees apart from one another in the outer peripheral surface (30c) of the spool (30), the first communication passage (36) and the second communication passage (37) may be located at different positions in the axial direction of the spool (30), the first communication passage (36) may linearly penetrate through the spool (30) from the first oil groove (31) to the third oil groove (33), and the second communication passage (37) may linearly penetrate through the spool (30) from the second oil groove (32) to the fourth oil groove (34).

This configuration of the embodiment can obtain a smooth flow of actuation oil flowing through the first and second communication passages. In addition, the configuration of the spool valve can be simplified.

In the above-described spool valve according to the embodiment, optionally, the spool (30) may have a cylindrical columnar shape having a circumferential outer peripheral surface (30c), the spool hole (10) may have a cylindrical inner peripheral surface (10c) and house the cylindrical columnar spool (30), an anti-rotation mechanism configured to prevent rotation of the spool (30) in the spool hole (10) may be located between the spool (30) and the spool hole (10), the anti-rotation mechanism may have a projection (38) on one of the outer peripheral surface (30c) of the spool (30) or the inner peripheral surface (10c) of the spool hole (10), and also have a groove (18) configured to accommodate the projection (38) and located in one of the inner peripheral surface (10c) of the spool hole (10) or the outer peripheral surface (30c) of the spool (30) such that the projection (38) is allowed to slide in the groove (18).

The spool valve according to the embodiment includes the first through fourth oil grooves circumferentially arranged in the outer peripheral surface of the spool. Thus, in a configuration in which the spool is circumferentially rotatable in the spool hole, the positional relationship between the first through fourth oil grooves and the valve body is not fixed, thus failing to keep a normal function of the spool valve. To prevent rotation of the spool in the spool hole in a configuration in which a substantially cylindrical columnar spool is housed in a substantially cylindrical spool hole, a mechanism for preventing the rotation of the spool is needed. In this regard, the anti-rotation mechanism with the above-described configuration ensures prevention of rotation of the spool in the spool hole with a simple configuration.

The reference numerals with brackets in the foregoing description are an example of the present disclosure and correspond to the reference numerals of the components of embodiments described above.

A spool valve according to the embodiment of the present disclosure has a reduced longitudinal dimension in the sliding direction of a spool, and thus, can be reduced in size and weight, while enabling switching of the distribution paths of a plurality of oil passages in accordance with sliding of the spool in a spool hole.

Obviously, numerous modifications and variations of the present invention are possible in light of the above teachings. It is therefore to be understood that within the scope of the appended claims, the invention may be practiced otherwise than as specifically described herein.

What is claimed is:

1. A spool valve comprising:
   a valve housing comprising:
     a spool hole;
     a first oil passage having a first port, a second port and a third port that are open to the spool hole; and
     a second oil passage having a fourth port, a fifth port and a sixth port that are open to the spool hole;
   a spool located in the spool hole to slide in an axial direction of the spool hole, the spool comprising;
     a first oil groove located in an outer peripheral surface of the spool;
     a second oil groove located in the outer peripheral surface of the spool;
     a third oil groove located in the outer peripheral surface of the spool;
     a fourth oil groove located in the outer peripheral surface of the spool, the first oil groove, the second oil groove, the third oil groove and the fourth oil groove being circumferentially arranged at an identical position in the axial direction;
     a first communication passage penetrating through the spool from the first oil groove to the third oil groove; and
     a second communication passage penetrating through the spool from the second oil groove to the fourth oil groove, the first port of the first oil passage being provided to communicate with the first oil groove of the spool, the second port and the third port being provided to selectively communicate with the third oil groove of the spool, the fourth port of the second oil passage being provided to communicate with the second oil groove of the spool, the fifth port and the sixth port being provided to selectively communicate with the fourth oil groove of the spool, the spool being slidable in the spool hole to switch communication of the third oil groove with the second port and the third port and to switch communication of the fourth oil groove with the fifth port and the sixth port.

2. The spool valve of claim 1,
   wherein the first oil groove, the second oil groove, the third oil groove, and the fourth oil groove are circumferentially spaced 90 degrees apart from one another in the outer peripheral surface of the spool,
   wherein the first communication passage and the second communication passage are located at different positions in the axial direction in the spool,
   wherein the first communication passage linearly penetrates through the spool from the first oil groove to the third oil groove, and
   wherein the second communication passage linearly penetrates through the spool from the second oil groove to the fourth oil groove.

3. The spool valve of claim 1, further comprising:
   an anti-rotation mechanism to prevent rotation of the spool in the spool hole, the anti-rotation mechanism being located between the spool and the spool hole,
   wherein the spool has a cylindrical columnar shape having a circumferential outer peripheral surface,
   wherein the spool hole has a cylindrical inner peripheral surface and houses the spool, and
   wherein the anti-rotation mechanism has
     a projection provided on one of the outer peripheral surface of the spool and the cylindrical inner peripheral surface of the spool hole, and
     a groove to accommodate the projection and located in another of the outer peripheral surface of the spool and the cylindrical inner peripheral surface of the spool hole along the axial direction such that the projection is slidable in the groove.

4. The spool valve of claim 1,
   wherein the spool is slidable between a first position and a second position in the axial direction, wherein, in a state where the spool is located at the first position, the first port communicates with the second port through the first oil groove, the first communication passage and the third oil groove, and the fourth port communicates with the fifth port through the second oil groove, the second communication passage and the fourth oil groove, and wherein, in a state where the spool is located at the second position, the first port communicates with the third port through the first oil groove, the first communication passage and the third oil groove, and the fourth port communicates with the sixth port through the second oil groove, the second communication passage and the fourth oil groove.

\* \* \* \* \*